United States Patent [19]

Lerner et al.

[11] E Patent Number: Re. 32,963

[45] Reissued Date of Patent: Jun. 27, 1989

[54] PACKAGING APPARATUS AND METHOD

[75] Inventors: Bernard Lerner, Peninsula; Dana Liebhart, Cuyahoga Falls, both of Ohio

[73] Assignee: Automated Packaging Systems, Inc., Twinsburg, Ohio

[21] Appl. No.: 125,866

[22] Filed: Nov. 27, 1987

Related U.S. Patent Documents

Reissue of:

[64] Patent No.: 4,651,506
Issued: Mar. 24, 1987
Appl. No.: 834,132
Filed: Feb. 24, 1986

U.S. Applications:

[63] Continuation of Ser. No. 688,696, Jan. 4, 1985, abandoned.

[51] Int. Cl.[4] ..... B65B 43/26

[52] U.S. Cl. ..... 53/459; 53/469; 53/570; 53/385; 225/106

[58] Field of Search ..... 53/384, 385, 459, 468, 53/469, 548, 570; 225/100, 101, 106; 249/234, 235

[56] References Cited

U.S. PATENT DOCUMENTS

| | | | |
|---|---|---|---|
| Re. 29,384 | 9/1977 | Hodson . | |
| 3,036,415 | 5/1962 | Ayres . | |
| 3,754,370 | 8/1973 | Hanson | 225/100 X |
| 3,774,367 | 11/1973 | Lerner . | |
| 3,815,318 | 6/1974 | Lerner . | |
| 3,877,562 | 4/1975 | Shaw . | |
| 3,879,918 | 4/1975 | Lerner . | |
| 3,938,299 | 2/1976 | Lerner | 53/459 X |
| 3,948,015 | 4/1976 | Lerner | 53/385 X |
| 3,965,653 | 6/1976 | Lerner . | |
| 4,078,358 | 3/1978 | Henderson . | |
| 4,157,003 | 6/1979 | Kamphaus | 53/585 X |
| 4,202,158 | 5/1980 | Lerner . | |
| 4,241,562 | 12/1980 | Meyer | 53/459 X |
| 4,284,221 | 8/1981 | Nagel | 225/106 X |
| 4,336,681 | 6/1982 | Onishi | 53/459 |
| 4,406,037 | 9/1983 | Hazenbroek . | |
| 4,493,684 | 6/1985 | Bolton | 493/234 |

FOREIGN PATENT DOCUMENTS

| | | | |
|---|---|---|---|
| 2039265 | 8/1980 | United Kingdom | 225/100 |

OTHER PUBLICATIONS

"9-Piece Cutter/Bagger: Box-A-Minute Output", Apr. 1980, Broiler Industry.

*Primary Examiner*—John Sipos
*Attorney, Agent, or Firm*—Watts, Hoffmann Fisher & Heinke

[57] ABSTRACT

A packaging machine for loading a chain or web of interconnected bag-like containers, including a conveyor system for advancing a lead bag to a loading station, a gripper assembly for clamping the bag to be loaded to a funnel mechanism including a pair of pivotally mounted horns; and, an incremental reversing mechanism for retracting the web after the bag is loaded to effect severance of the bag from the web along a line of weakness. The web is advanced by a transmission that includes a drive motor and clutch for selectively coupling the drive source to a web feed roll. The drive system includes a chain for driving the feed roll a segment of which is reeved around a pair of sprockets carried by a slidable shuttle. The shuttle is reciprocated by a fluid pressure operated actuator to produce incremental reverse translation in the chain when web retraction is desired. An accumulating mechanism is provided for storing product to be packaged while a bag is being positioned at the loading station.

33 Claims, 7 Drawing Sheets

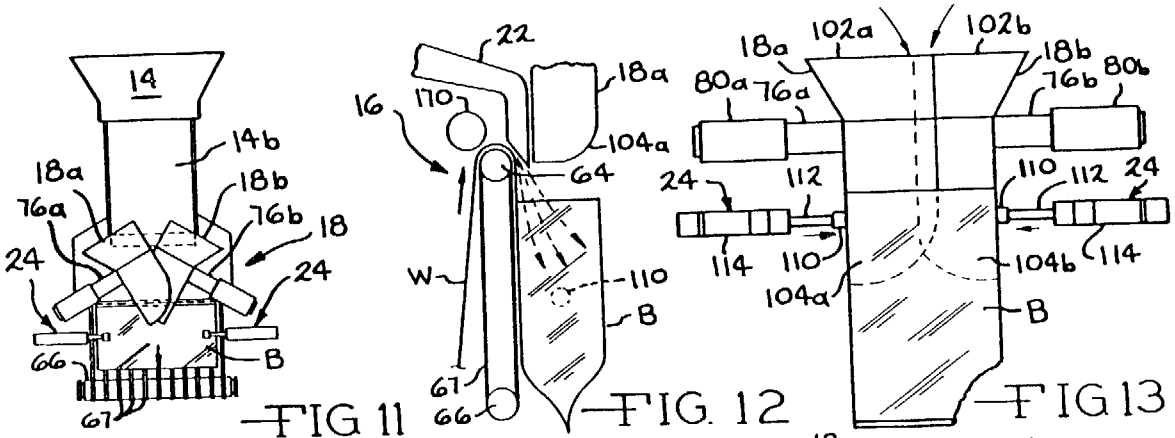
FIG. 11
FIG. 12
FIG. 13
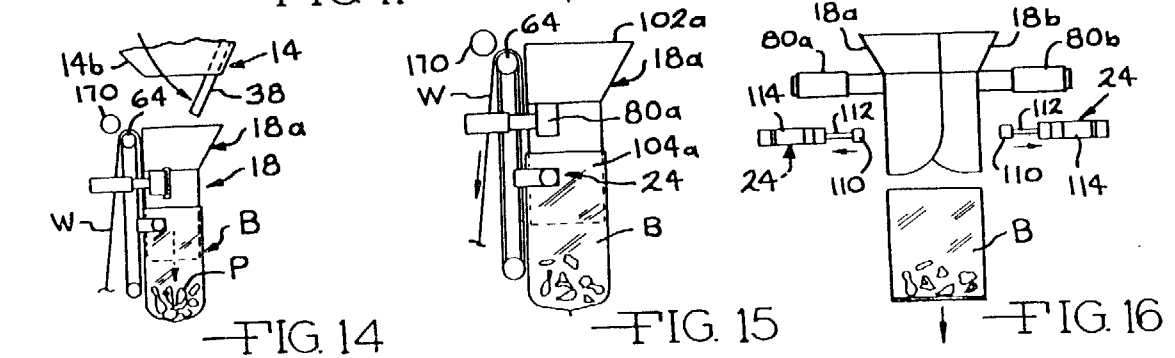
FIG. 14
FIG. 15
FIG. 16

PACKAGING APPARATUS AND METHOD

Matter enclosed in heavy brackets [ ] appears in the original patent but forms no part of this reissue specification; matter printed in italics indicates the additions made by reissue.

This application is a continuation of application Ser. No. 688,696, filed Jan. 4, 1985, now abandoned.

DESCRIPTION

1. Technical Field

The present invention relates generally to packaging systems and in particular to a method and apparatus for loading and separating a container from a chain or web of containers.

2. Background Art

Various methods and apparatus for packaging articles in plastic bags are available today or have been suggested in the past. In one packaging method, the bags form part of a continuous plastic web, each bag being connected to a contiguous bag along a line of weakness. Typically, the bags define an opening on one face through which the bag is loaded.

In early bagging machines, an operator manually loaded the product into the bag and the bag was pulled downwardly to position the next bag at the loading station. The loaded bag was then manually severed from the web.

Machines and methods for automatically loading a chain of interconnected plastic bags have been developed or have been suggested by the prior art. In general, these machines included a mechanism for sequentially feeding a lead bag to a loading station; a mechanism for expanding the mouth of the bag and maintaining it in the expanded condition during a loading operation; and, a mechanism for severing the loading bag from the chain. After the loaded bag is severed, the packaging sequence begins again with the next bag.

The individual bags are usually joined to the chain or web by a line of weakness generally formed by a plurality of perforations. After the bag is loaded, it is severed from the web along the perforations. Various mechanisms for automatically severing the loaded bag from the web have been developed or suggested. In one known method, the separation along the perforations is initiated by a projection that begins the tearing action near the center of the line of weakness. Severance of the bag then begins at the center of the line of weakness and proceeds outwardly toward the marginal edges. An example of such a mechanism is shown in U.S. Pat. No. 3,477,196, which is owned by the present assignee.

An alternate method for severing a loaded bag from the web is disclosed in U.S. Pat. No. 4,202,153 which is also owned by the present assignee. In the method and apparatus shown in this patent, a transversely movable product carrier enters an opened bag, positioned horizontally, and simultaneously loads the bag and severs it from the web. Severance is achieved by overdriving the product carrier so that it engages the bottom of the bag and drives it away from the web while the remainder of the web is held stationary, thus tearing the loaded bag from the web. In the disclosed apparatus, the perforation breakage commences in portions near the marginal edges of the web and advances inwardly from both portions toward the center. Because the perforations are broken serially, the force needed to sever the container is less than that required if the perforations were broken simultaneously.

In U.S. Pat. No. 3,815,318 (also owned by the present assignee), a packaging method and apparatus is disclosed which illustrates another apparatus for severing a loaded bag along a line of weakness. In this apparatus, the tearing action is produced by a pivoting mechanism which engages a loaded bag and pivots the bag about an axis located near one marginal edge while the web is held stationary. The tearing action then commences at a remote marginal portion and advances towards the edge of the bag that is located at or near the pivot axis.

The methods and apparatus described in the above referenced patents all perform satisfactorily for most if not all bagging operations. The disclosed methods and machines have been used to package a variety of articles such as literature, industrial fasteners, and other industrial products. Recently, it has become desirable to provide a means for packaging slaughtered poultry in a quick and reliable manner.

Poultry has become a very popular staple throughout the world. The comsumption of poultry has increased significantly over the years. The substantial increase in consumption is due in part to the cost effective manner in which poultry is brought to market. The process has grown more automated over the years and further automation is needed.

Efforts have been to completely automate the chicken harvesting process. In copending U.S. application Ser. No. 688,911, an apparatus and method for cutting slaughtered poultry into separate pieces is disclosed. To increase the production rate, a bagging apparatus capable of packaging the poultry parts as they are discharged by the cutting machine is desirable. It is obviously important to minimize the labor costs involved in order to maintain the cost effectiveness of the process. It has been found that current automatic cutting equipment is capable of processing poultry at the rate of 20 or more carcasses per minute.

It is believed that packaging equipment currently available or suggested in the past could not readily package poultry parts without substantial modification or alternately could not operate reliably at the required packaging rates especially when subjected to the rather harsh environment encountered in a poultry processing plant. It must be remembered that apparatus used in this type of application must be easily cleaned, which in most cases is done with a high temperature, high pressure water spray.

DISCLOSURE OF THE INVENTION

The present invention provides a new and improved packaging apparatus and method for sequentially loading and severing bags from a chain or web of interconnected bags. The disclosed apparatus and method is particularly adapted for automatically packaging poultry discharged by a poultry cutting machine. The apparatus is capable of high speed and reliable operation even in the environment of a poultry processing plant.

According to the invention, the apparatus includes structure defining a feed path for a chain of interconnected bags extending from a supply station to a bag loading station. A feed mechanism advances successive bags to the loading station. Once positioned at the station, the mouth of the bag is opened preferably by a blast of air from a nozzle located adjacent the bag opening. After the bag is opened, a funnel arrangement enters at least a portion of the bag to maintain its expanded condition and to guide the product being loaded.

In the illustrated and preferred construction, the funnel arrangement is defined by a pair of pivotally mounted horns. As the bag is fed to the loading position, the horns are rotated to a position spaced from the opening of the bag. Once the mouth of the bag is opened, the horns are pivoted towards the bag such that end portions of the horns enter the mouth of the bag. Together the horns define a funnel-like structure when they are in the product loading position.

During the loading operation, the bag being loaded is substantially immobilized by a gripper mechanism. In the preferred embodiment, the gripper mechanism comprises a gripper assembly associated with each horn. The gripper assemblies are located near the end portions of the horns and each includes an extendable gripper pad which is operative to clamp a portion of the bag against the side of the horn. When the gripper assemblies are energized, each pad is extended into abutting contact with its associated horns. Since the grippers are energized after the horns enter the mouth of the bag, side regions of the bag are clamped between the bag and its associated horn. With this arrangement, loading forces exerted on the bag by the product being loaded are isolated from the rest of the chain or web.

The individual bags are joined to the web by a lines of weakness preferably formed by a plurality of perforations. In the preferred method, the loaded bag is severed from the web by retracting or reverse feeding the web while the loaded bag remains clamped to the horns. In other words, the direction of web feed is reversed while preventing movement in the loaded bag thus causing the web to sever itself from the loaded bag. After loading and severing the bag, the grippers are retracted, allowing the loaded bag to fall from the loading horns and into a receptacle or on to a conveyor, etc. for further processing or shipment.

According to the exemplary embodiment, the bag being loaded is oriented vertically so that the product is loaded into the bag by gravity. By using the disclosed gripper/horn mechanism, the forces exerted by the products as it falls into the bag are isolated from the rest of the web and thus premature separation along the lines of weakness (which define the individual bags) is inhibited.

A conveyor system, including a pinch roller assembly is operative to position a lead bag in the web at the loading station. The pinch roller assembly includes an externally driven conveyor roller and a feed roller biases into engagement with the conveyor roller. The feed roller is frictionally driven by the conveyor roller. A transmission, constructed in accordance with a preferred embodiment of the invention controls the direction of roller rotation and is actuatable to either advance or retract at least a portion of the web. In the preferred embodiment, retraction of the web is achieved by a mechanism that imparts an incremental reverse rotation to the pinch roller assembly to produce a slight retraction in the web.

In the illustrated embodiment, the transmission includes one or more chains or belts for transferring rotation from a drive source such as an electric motor to the pinch roller. To minimize slippage and to enhance durability, in the disclosed embodiment, chains are used as power transfer elements. In the disclosed construction, primary and secondary chain systems are employed. The primary chain connects the drive motor to a clutch assembly which in turn controls the coupling of the primary chain drive to the secondary chain drive. The conveyor roller is driven by the secondary chain drive. With the preferred method, a bag is advanced to the loading station by actuation of the clutch assembly to interconnect the primary and secondary chain drives to produce continuous rotation in the conveyor roller until the lead bag in the web is fed to the loading position.

As indicated above, the loaded bag is severed by retracting the web slightly while the bag remains clamped to the loading horns. In the preferred method, retraction of the web is achieved by reverse rotation of the conveyor roller. Although reversing the direction of roller rotation by reversal of the drive motor is contemplated by the present invention, in the preferred embodiment, the reverse rotation of the roll is achieved by a fluid pressure operated actuator connected to a slidable shuttle block that forms part of the secondary chain drive. In particular, the slidable shuttle carries a pair of sprockets connected to the secondary chain. The segment of the second chain coupled to the sprockets drivingly engages the conveyor roller.

When retraction of the web is desired, the drive motor is declutched from the secondary chain drive. The segment of the chain, connected to the clutch assembly, is immobilized preferably by a brake forming part of the assembly which, when energized, locks an output drive sprocket (of the clutch assembly) to inhibit rotation.

The fluid pressure operated actuator is then actuated to displace the shuttle block causing the chain segment coupled to the shuttle sprockets to translate. The conveyor roller being coupled to the translating segment of the chain is caused to reverse rotate slightly, thus causing retraction of the web and ultimately severance of the loaded bag. With the disclosed arrangement, extremely rapid cycle times are achievable without sacrificing the reliability of the overall feed mechanism.

According to a feature of the invention, the bagging apparatus includes an accumulator for holding products while a bag is being positioned at the loading station. The accumulator is especially useful in a poultry packaging application for it enables two or more poultry carcasses to be accumulated and loaded into a single bag. In the preferred embodiment, the accumulator is defined by a funnel-like receptacle having a pivotally mounted exit door. The exit door, preferably located at the base of the accumulator, is opened and closed by a fluid pressure operated actuator in synchronization with the bag positioning and horn actuating mechanism.

Additional features of the invention will become apparent and a fuller understanding obtained by reading the following detailed description made in connection with the accompanying drawings.

BRIEF DESCRIPTION OF DRAWINGS

FIGS. 11-16 illustrate, schematically, the packaging sequence provided by the disclosed bagging apparatus.

BEST MODE FOR CARRYING OUT THE INVENTION

Figure 1:
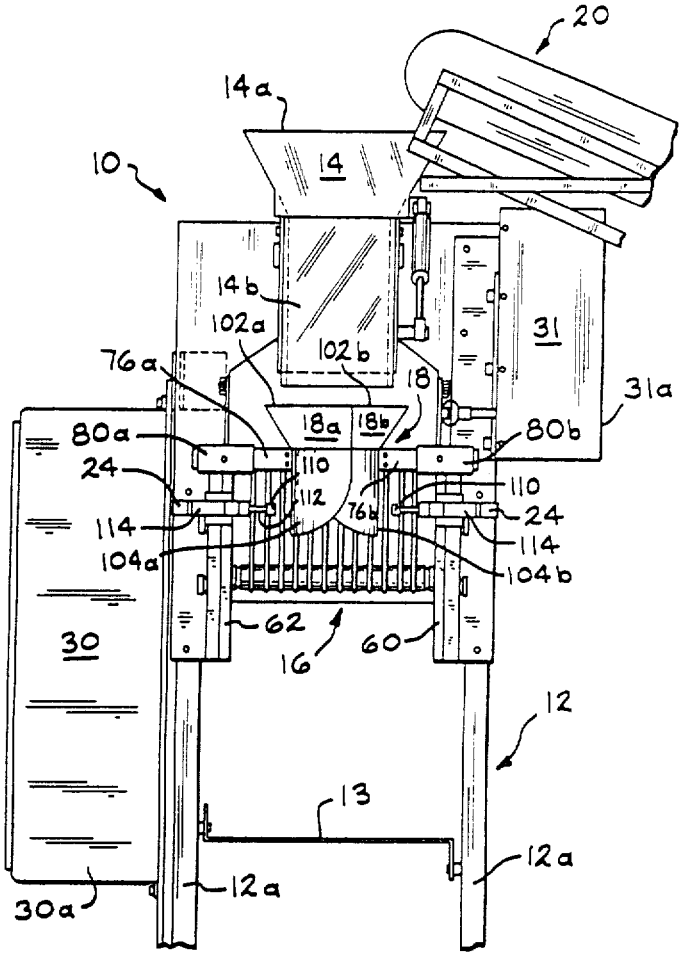
FIG. 1 is a front elevational view of a bagging apparatus constructed in accordance with a preferred embodiment of the invention.
Figures 2, 3:
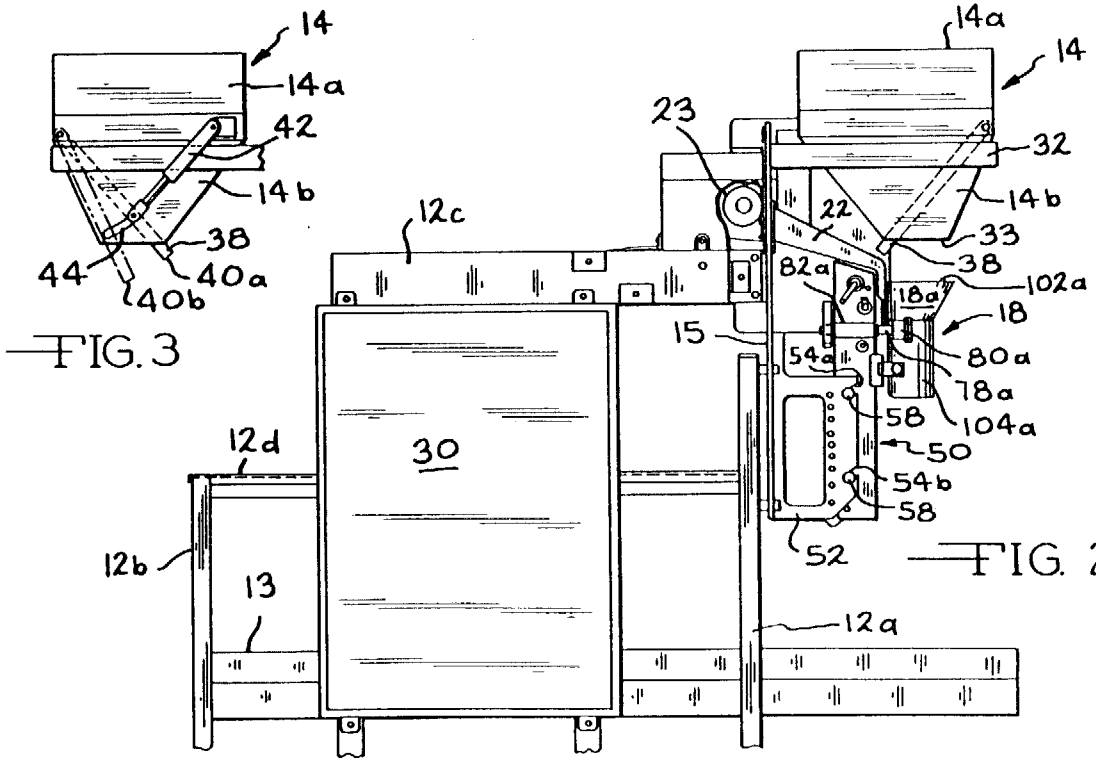
FIG. 2 is a fragmentary, side elevational view of the bagging apparatus shown in FIG. 1.
FIG. 3 is a side elevational view of an accumulator forming part of the bagging apparatus shown in FIG. 1.

FIG. 1 illustrates an overall view of a bagging apparatus 10 constructed in accordance with the preferred embodiment of the invention. Referring also to FIG. 2, the bagger 10 includes a frame indicated generally by the reference character 12. The frame 12 includes a plurality of uprights 12*a*, 12*b* and interconnecting cross pieces 12*c*, 12*d*. A longitudinal shelf 13 extends transversely along the base of the frame and is supported by the uprights 12*a*, 12*b*. A primary support plate 15 is fastened to the uprights 12*a*. The support plate 15 in conjunction with the other structural members support a product receiving hopper 14, a bag feeding mechanism indicated generally by the reference character 16 and a bag loading mechanism indicated generally by the reference character 18 which also defines a loading station for a bag. The product to be packaged is conveyed to the hopper 14 by a conveyor indicated generally by the reference character 20 in FIG. 1. It should be apparent that the product to be packaged drops from the conveyor 20 into the hopper 14 and is guided into an awaiting bag positioned at the loading station 18.

The preferred packaging process is schematically illustrated in FIGS. 11-16. The disclosed apparatus is operative to sequentially load a web or chain "W" of interconnected bags. A lead bag B of the chain of bags or web W is advanced towards a loading position by the conveyor mechanism 16. In the preferred construction, the loading mechanism comprises a pair of interfitting horns 18*a*, 18*b*, which together define a funnel-like structure when in the loading position.

As the bag B is being advanced, the loading mechanism 18 is retracted upwardly as shown in FIG. 11. As the bag B advances to the load position, a blast of air from a nozzle 22 fed by a blower 23 (shown in FIG. 2) expands the bag as shown in FIG. 12. The loading mechanism is then lowered so that a bottom portion of each horn 18*a*, 18*b* enters an upper region of the bag. Grippers 24 are then actuated in order to clamp the upper region of the bag B to the side of the horns 18*a*, 18*b*. Product P drops from the hopper 14 and is guided into the bag B. The loaded bag is then severed from the web W by reversing motion in the web W as shown in FIG. 15 to cause separation of the bag from the remainder of the web along a line of weakness. The grippers 24 are then retracted to release the loaded bag from the horns 18*a*, 18*b*.

Returning to FIG. 1, the bagging apparatus includes a control module 30 and drive module 31 both covered by respective housings 30*a*, 31*a*. The module 30 contains electronic control circuitry for the various machine functions whereas the module 31 houses the drive system for the web and bag conveyor mechanism 16.

Referring also to FIGS. 2 and 3, the hopper 14 is mounted to the top of the bagger 10 and supported by frame members 32 attached to the support plate 15. An upper portion 14*a* of the hopper 14 defines a tapered mouth for receiving the product to be packaged. A lower region 14*b* defines a funnel-like shell having an exit opening 33 located just above and aligned with the horns 18*a*, 18*b* when the horns are in their product loading position as seen in FIG. 2.

According to a feature of the invention, the hopper 14 includes an accumulating mechanism which in the illustrated embodiment comprises a pivotally mounted gate 38. As seen best in FIG. 3, the gate 38 is movable between an open position 40*a* and a closed position 40*b* by an actuator 42 which is pivotally connected to the side of the gate 38 via a slot 44 formed in the lower section 14*b* of the hopper 14. The actuator 42 may be of a conventional construction and preferably of a fluid pressure operated variety. With the use of the disclosed accumulating mechanism, the conveyor 20 (shown in FIG. 1) can drop product to be packaged into the hopper without interruption even during the period of time a bag B is being positioned at the loading station 18.

Figure 4:
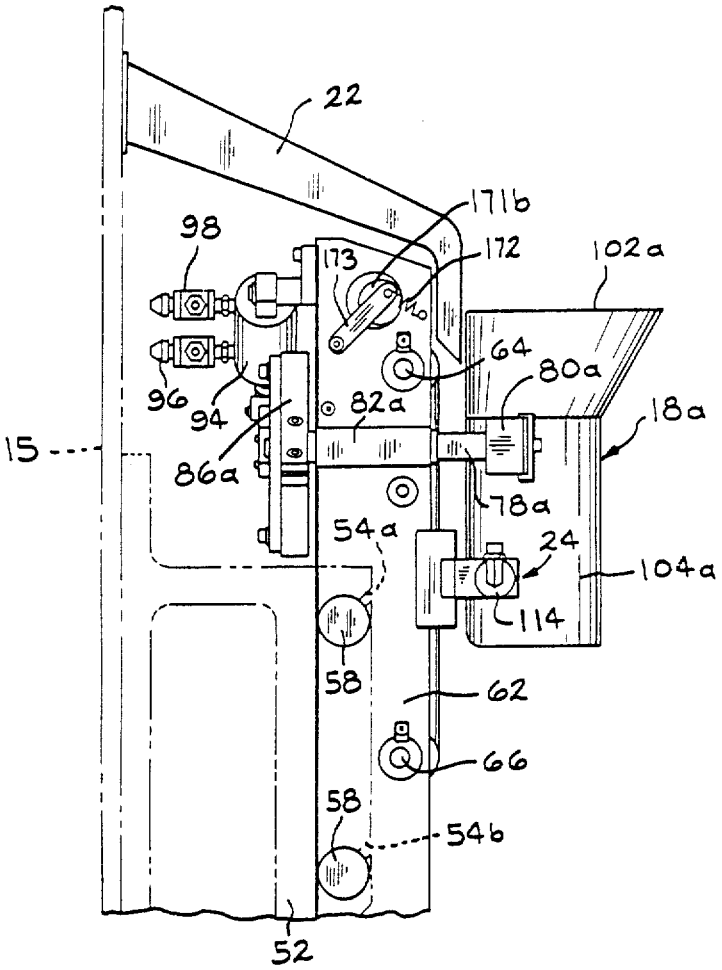
FIG. 4 is another fragmentary, side elevational view of the bagging apparatus.
Figure 5:
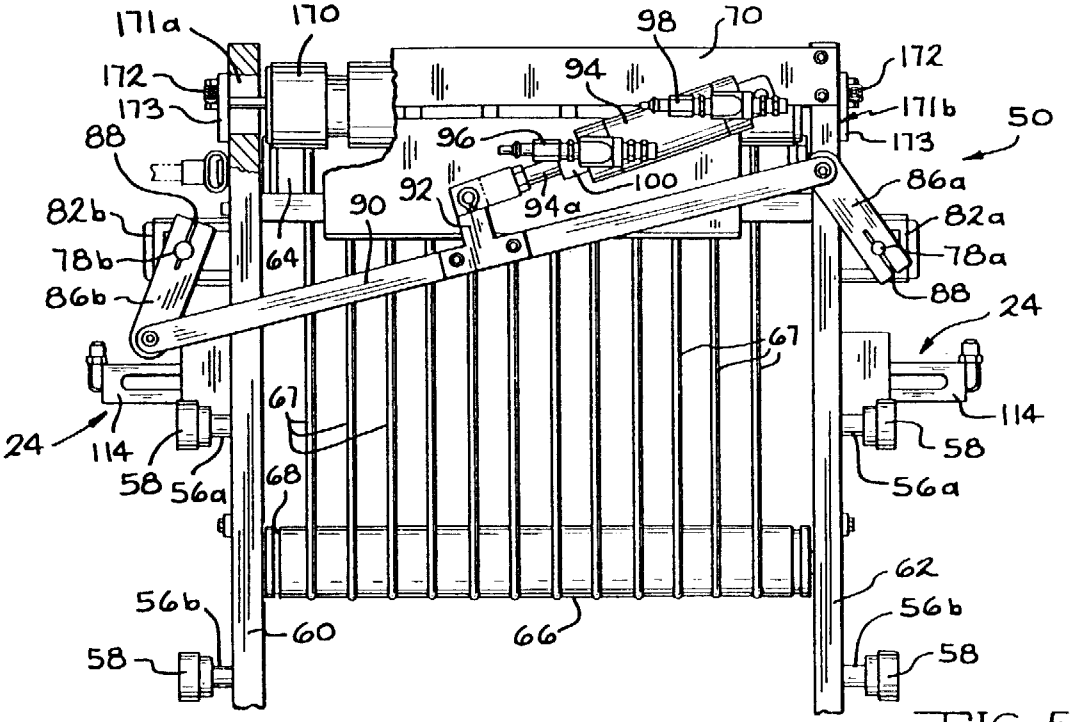
FIG. 5 is a rear, elevational view of a feed mechanism forming part of the bagging apparatus.

Referring to FIGS. 4 and 5, the bag conveyor and horn mechanism forms part of a removable assembly indicated generally by the reference character 50 in FIG. 5. As seen in FIG. 2, the bagging machine frame includes a pair of intermediate support plates 52 (only one is shown in FIG. 2) which each include a pair of vertically spaced diagonal slots 54*a*, 54*b*. The slots are adapted to receive a pair of vertically spaced pins 56*a*, 56*b* forming part of the conveyor/horn assembly 50 as shown best in FIG. 5. The pins 56*a*, 56*b* include locking knobs 58 which secure the position of the assembly 50 in the support plates 52 once the assembly is mounted.

Referring in particular to FIG. 5, the rear of the conveyor is illustrated. The assembly 50 includes a pair of vertical side plates 60, 62 which journal upper and lower conveyor rollers 64, 66. A plurality of O-ring like belts 67 are reeved around the rollers, their relative spatial positions being maintained by grooves 68 formed in the rollers. A crossbar 70 is fastened to the upper ends of the side plates to maintain the side plate distance and rigidize the structure. A lower crossbar not shown serves a similar function at the lower end of the assembly.

As indicated above, the individual horns 18*a*, 18*b*, which together define a funnel-like structure when located in the load position, are pivoted between the retracted and load positions by a fluid pressure operated mechanism shown best in FIG. 5. Referring also to FIGS. 1 and 4, the horns 18*a*, 18*b* are supported by associated arms 76*a*, 76*b*. The arms in turn are connected to shafts 78*a*, 78*b* by coupling caps 80*a*, 80*b*. The shafts 78*a*, 78*b* are journalled in associated bearing blocks 82*a*, 82*b* suitably secured to the respective side plates 60, 62.

As seen in FIG. 5, rear portions of the associated shafts are engaged by lever arms 86*a*, 86*b* which each include clamping slots 88 by which the radial position of the arms on the shafts can be adjusted. The lever arms are interconnected by a coupling link 90 which includes a centrally positioned intermediate link 92. A fluid pressure operated actuator 94 pivotally mounted at one end to the crossbar 70 includes an actuating rod 94*a* operatively connected to the intermediate link 92 such that extension and retraction of the actuating rod transmitted to the coupling link 90 causes the lever arms 86a, 86b to concurrently rotate through predetermined arcs.

In the disclosed arrangement, when the actuating rod 94a is retracted, the horns 18a, 18b are rotated to the upper, retracted positions and when the actuator rod is extended, the horns 18a, 18b rotate downwardly to their loading positions. In the illustrated construction, the actuator is pneumatically operated and hence includes pneumatic fittings 96, 98. The actuator also includes an adjustable stop 100 for adjusting the overall stroke of the mechanism.

Returning to FIG. 1, the horn 18b is sized so that a portion fits inside the horn 18a. With this construction, when the horns 18a, 18b are in the loading positions, a somewhat continuous funnel-like guide is defined. Each horn also includes an upper expanded portion 102a, 102b which defines a receiving opening aligned with and slightly larger than the exit opening 33 of the hopper 40. Lower segments 104a, 104b of the respective horns 18a, 18b are somewhat cylindrical and uniform (when positioned in the loading position) so that together, the horns 18a, 18b define a cylindrical guide-like structure for guiding product into a bag.

Referring to FIGS. 1 and 4, a bag being loaded is clamped to the horns 18a, 18b by the gripping 24 which are secured to associated conveyor side plates 60, 62. As seen best in FIG. 1, each gripper assembly includes a gripper pad 110 mounted at the end of an actuating rod 112. The gripper pad 110 and associated rod 112 are driven towards and away from the associated horn by a fluid pressure operated actuator 114. When a bag is positioned around the lower regions of the horns 18a, 18b, the gripper assemblies are actuated to drive the gripper pads 110 into abutting contact with the sides of the associated horns, thus clamping the bag to the horn assembly and isolating it from the remainder of the web as shown in FIG. 13. Once the bag to be loaded is clamped to the horns, loading forces generated by the product as it drops into the bag are not transmitted to the rest of the web.

As indicated above, when the bag is loaded, it is severed from the remainder of the web by retracting the web slightly so that the web severs itself from the loaded bag along a line of weakness.

Referring to FIGS. 6–10, the drive system for the web/bag conveyor is illustrated. The drive system is located in the housing 31 and includes a drive motor 150 suitably mounted to a side plate 152 of the housing. In the preferred construction, the drive motor 150 is continually energized during the bagging operation even though the conveyor itself is only intermittently operated to position successive bags at the loading station. To achieve this intermittent driving arrangement, the drive motor is connected to a clutch/brake assembly 160 by a chain 162. An idler sprocket 164 is movable to adjust the tension on the chain 162.

The clutch assembly 160 controls the interconnection between the primary chain 162 and a secondary chain drive, indicated generally by the reference character 163. The secondary drive includes a chain 165 which is driven by the clutch assembly 164 when it is energized and which in turn drives a sprocket 167 connected to the upper conveyor roller 64. Referring to FIGS. 4 and 5, a pinch roller or feed roll 170 rotates in bearings 171a, 171b adjustably positioned in the conveyor assembly sideplates 60, 62. The feed roll 170 is biased into abutting contact with the upper conveyor roll 64 by a pair of biasing springs 172. Lever arms 173 provide a floating type engagement for the feed roll to allow the feed roll 170 to move towards and away from the upper conveyor roll 64 as the web is being fed to compensate for changes in material thickness. It should be apparent that the frictional coupling between the feed roll 170 and upper conveyor roll 64 and between the O-ring belts 67 and upper conveyor roller 64 causes the entire conveyor system including the O-ring belts 67 and lower conveyor roll 66 to rotate whenever the upper conveyor roller 64 rotates.

Figure 6:
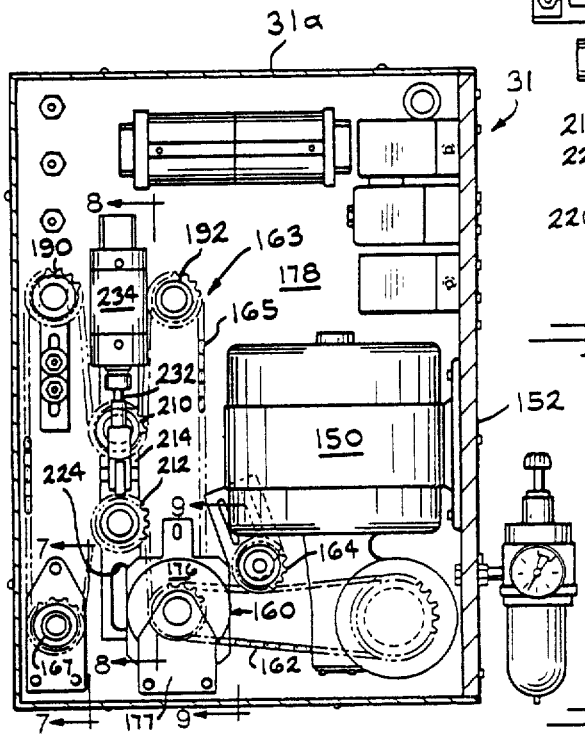
FIG. 6 is side elevational view of a feed roller drive mechanism forming part of the bagging apparatus.
Figure 9:
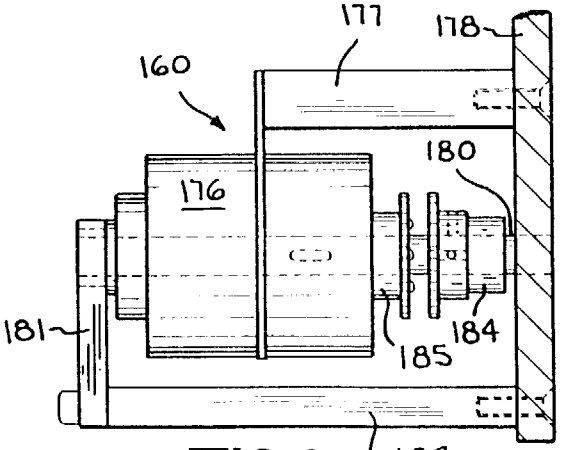
FIG. 9 is a fragmentary view as seen from the plane indicated by the lines 9—9 in FIG. 6.
Figure 10:
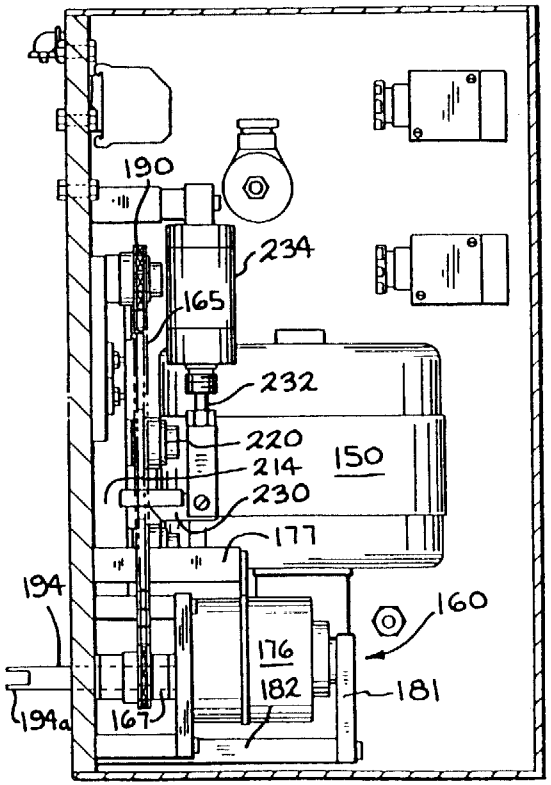
FIG. 10 is a side view of the feed roll drive mechanism shown in FIG. 6.

As seen in FIGS. 6 and 9, the clutch/brake assembly 160 is conventional and includes an electromagnetic clutch/brake unit 176 mounted to a backplate 178 of the drive housing 31 by an L-shaped bracket 177. The assembly includes a shaft 180, journalled at one end in the backplate 178 and journalled at its other end in a support piece 181 spaced from the backwall 178 by a spacing plate 182. The assembly also includes a pair of chain sprockets 184, 185. The outer sprocket 184 is fixed to the shaft 180 and is coupled to the primary chain 162 and in normal operation is continuously driven by the drive motor 150. The outer sprocket 185 forms part of the secondary drive. Its rotation is controlled by the electromagnetic unit 176. When the clutch function of the unit 176 is actuated, the sprocket 185 is frictionally coupled to the shaft 180 and hence rotates in unison with the outer sprocket 184. With the clutch actuated, the rotation in the drive motor 150 is transferred to the upper conveyor roller 64 via the sprocket 167. In the preferred construction, the direction of rotation is such that the web is driven in the forward direction whenever the clutch is actuated.

When the unit 176 is deenergized, the shaft 180 freely rotates relative to the inner sprocket 185. As indicated above, the unit 176 also includes a braking function which, when actuated, frictionally locks the inner sprocket 185 to the unit 176 to prevent or inhibit relative rotation in the sprocket 185.

Figure 7:
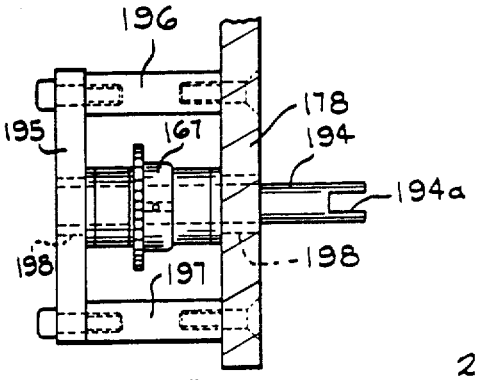
FIG. 7 is a fragmentary view as seen from the plane indicated by the lines 7—7 in FIG. 6.

Returning to FIG. 6, and referring also to FIG. 7, additional details of the secondary drive system 163 are illustrated. The second chain 165 is reeved around a pair of spaced, idler sprockets 190, 192. The sprocket 190 is adjustably positioned to adjust the overall chain tension of the chain 167. The drive sprocket 165 (which drives the upper conveyor roll 64) is fastened to a stub shaft 194 (shown in FIG. 7 only). The shaft 194 is journalled between the backplate 178 and a support plate 195 spaced from the backplate 178 by a pair of transversely extending spacers 196, 197. Bearings 198 rotatably support the shaft 194 in the plates. The stub shaft 194 includes a forked end 194a which interconnects with the upper conveyor roller 64 in a known manner, so that rotation of the sprocket and shaft causes rotation of the conveyor roll.

According to the invention, the lead bag in the web (indicated by the reference character B in FIG. 12) is advanced to the loading position by energizing the clutch 160 to couple the drive motor 150 to the sprocket 167 via the chains 162, 165. The clutch remains energized until the bag is advanced to the load position whereupon the clutch is deenergized.

As indicated above, the loaded bag is preferably severed from the remainder of the web by retracting the web slightly while the engagement between the loading horns 18a, 18b and the loaded bag is maintained by the grippers 24. The tension forces generated between the bag held by the gripper assemblies 24 and the rest of the web cause a severance along a line of weakness, preferably formed by a plurality of perforations located between adjacent bags. Although various reversing drive arrangements known in the art can be employed to produce this reverse feed of the web, in the preferred embodiment, a fluid pressure operated actuator is used to produce an incremental reverse rotation in the upper conveyor roll 64.

Figure 8:
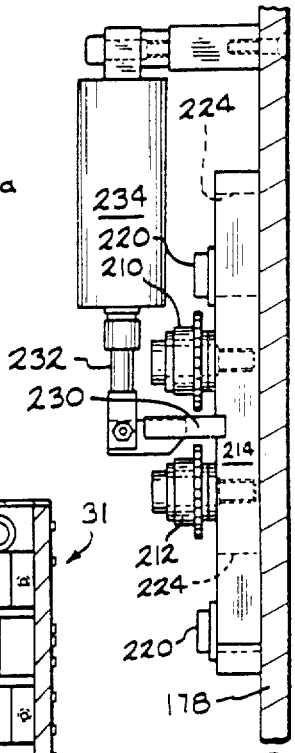
FIG. 8 is a fragmentary view as seen from the plane indicated by the lines 8—8 in FIG. 8.

Referring in particular to FIGS. 6 and 8, the secondary chain drive 163 includes a pair of sprockets 210, 212 rotatably carried on a shuttle block 214. In the illustrated arrangement, the sprockets 210, 212 are journalled on pins 216 threadedly received by the shuttle block 214. The shuttle block [is] 214 *is* vertically slidable along the back plate 178 and is held to the back plate by a pair of shoulder bolts 220 which extend through vertical slots 224 formed in the shuttle block 214. It should be apparent that the mounting arrangement enables vertical reciprocating motion in the shuttle 214 while resisting transverse motion. An operating arm 230 extends transversely from the shuttle block 214 and is connected to the end of an actuating rod 232 forming part of a fluid pressure actuator 234. As seen in FIG. 8, when the actuating rod 232 is retracted into the actuator, the shuttle block 214 moves upwardly, whereas when the actuator rod is extended, the shuttle block moves downwardly. As seen in FIG. 6, the second drive chain 165 is reeved around the shuttle sprockets 210, 212.

In order to produce reverse movement in the web W, as indicated schematically in FIG. 15, the fluid pressure operated actuator 234 is energized to extend the actuating rod 232 while the brake function is applied by the clutch/brake unit 176 to prevent movement of the secondary chain 165 in the section reeved around the clutch/brake sprocket 185 and the fixed idler sprocket 192. It should be apparent that as the shuttle block 214 moves downwardly, the segment of the chain 165 reeved around the conveyor roll sprocket 167, the adjustable idler sprocket 190 and the shuttle sprockets 210, 212 is displaced and in particular produces rotation in each of these four sprockets. The downward movement of the shuttle produces clockwise movement in the conveyor roll drive sprocket 167 which causes the web held between the upper conveyor roller 64 and the spring biased feed roller 170 to reverse feed.

Since the forward end of the web is fixed by virtue of the clamped loaded bag, the generated tension in the web causes severance along a line of weakness. In normal operation, a line of perforation is located intermediate the loaded bag and the web region held between the feed roll 170 and conveyor roll 64. Severance occurs along the perforations.

Since the actuator produces rather abrupt travel in the shuttle 214, the web retraction occurs at a rapid rate causing swift and consistent separation of the web from the loaded bag. The actuator is then immediately retracted to advance the severed end of the web forwardly. If the lead bag is to be loaded, the clutch/brake unit is energized to clutch the primary drive to the secondary drive 163 to produce forward rotation of the upper conveyor 64.

With the preferred construction, separation of the loaded bag from the remainder of the web can be done reliably and quickly. Moreover, by using a quick acting actuator mechanism, the feed rate of the machine is substantially improved over a system that would require [o] reverse rotation of either the drive motor or the secondary drive chain via a clutch/brake system. As indicated above, with the preferred method, the drive motor 50 rotates continuously throughout the bagger operation and is merely clutched or declutched from the conveyor drive system in order to control advancement of the web.

The disclosed bagging apparatus and method is especially suited for packaging poultry parts produced by a poultry cutting machine and conveyor system such as that disclosed in copending U.S. application Ser. No. 688,911 now U.S. Pat. No. 4,589,165 filed concurrently herewith, and entitled Apparatus and Method for Cutting Slaughtered Poultry into Separate Pieces, which is hereby incorporated by reference. The product conveyor 20 (illustrated in FIG. 1 only) operates continuously and transports cut poultry carcasses to the bagging machine 10 for packaging into bags. In normal operation, individual bins (not shown) of the conveyor 20 each include a single poultry carcase divided into eight or nine parts. The divided carcass is deposited on the conveyor 20 at an unloading station of the cutting machine. It has been found desirable to package multiple carcasses in a single bag. The hopper/gate [mechanimsm] *mechanism* 38 shown in FIGS. 1–3 enables multiple products to be packaged in a single bag. As indicated previously, a fluid pressure operated actuator 42 controls the position of the gate 38. Referring also to FIGS. 14–16, the gate 38 is moved to the open position 40*a* once the lead bag B has been clamped to the sides of the horns 18*a*, 18*b* by the gripper assemblies 24. As soon as the loading of the bag has been completed, the gate actuator 42 retracts in order to close off the exit opening 33 of the hopper 14. Any product discharged by the conveyor 20 is then retained in the hopper. During the period of time that the gate 38 is closed, the loaded bag is severed from the web and dropped from the horns 18*a*, 18*b*. The web is then advanced to position the next bag at the load position. Once the gripper assemblies 24 are actuated to clamp the bag to the horns, the gate actuator is then extended to open the gate 38 to allow the product to drop into the waiting bag. It should be apparent [a] that depending on the speed of the conveyor 20, one or more products can be discharged into the hopper 14 during the period of time the gate 38 is closed and hence the number of products loaded into a single bag can be adjusted by controlling the period of time the gate 38 is closed and/or the speed of the conveyor 20.

Although the invention has been described with a certain degree of particularity, it should be understood that those skilled in the art can make various changes to it without departing from the spirit or scope of the invention as hereinafter claimed.

We claim:

1. In a packaging machine:

(a) structure establishing a path of travel for a web of interconnected bag-like containers;

(b) means for advancing said web along said path to successively position each of said containers at a loading station;

(c) means for expanding a container positioned at said loading station;

(d) funnel means movable into said expanded container for guiding the product into said container;

(e) gripper means operative to immobilize said container at said loading station to inhibit relative movement between said container and said funnel means;

(f) container separating means for severing said container from said web, comprising means for reversing movement in said web while said container is immobilized, said separating means operative to retract the web to cause separation along a line of weakness connecting said loaded container to the web.

2. The apparatus of claim 1 wherein said means for expanding said container comprises a burst of relatively high velocity air.

3. The apparatus of claim 1 wherein said means for immobilizing the container comprises a gripper means for clamping a face of said bag to said funnel means.

4. The apparatus of claim 1 wherein said funnel means comprises a pair of pivotally mounted horns which together define a funnel-shaped structure when pivoted to a loading position.

5. The apparatus of claim 1 wherein said means for reversing said web comprises a fluid pressure operated actuator operatively connected to a web drive roller such that upon actuation said actuator reverse rotates said drive roller.

6. The apparatus of claim 1 further including a feed hopper including a closure gate for holding articles to be packaged until a container has been positioned and opened at said loading station.

7. A method of packaging comprising the steps of:

(a) providing a web of packaging material defining a plurality of containers, each container joined to a contiguous container by a line of weakness;

(b) advancing one of said containers to a loading station;

(c) expanding said container to an open position;

(d) positioning a funnel means inside an opening defined by said container;

(e) clamping a face of said container to said funnel means to immobilize said container;

(f) loading said open container;

(g) retracting said web a predetermined distance while said loaded container remains clamped to said funnel means to cause separation of said web from said container along the line of weakness connecting said container to said web;

(h) releasing said clamping means to allow said loaded container to be discharged from said loading station.

8. The method of claim 7 wherein said step of opening said container is achieved by a burst of high velocity air.

9. The method of claim 7 further comprising the step of holding articles to be packaged in an accumulating means until a container has been positioned and opened at said loading station.

10. In a machine for loading a web of interconnected bag-like containers, a web feed mechanism including means to sever a leading portion of said web of interconnected bag-like containers, comprising:

(a) a pinch roller assembly defined by a conveyor roller and an associated feed roller biased into contact with said conveyor roller such that said rollers drivingly engage a web positioned between said rollers;

(b) a roller drive mechanism comprising:

(i) a drive source and a clutch means for selectively coupling said drive source with said conveyor roller to drive said web in an advancing direction;

(ii) reversing means including means for disengaging said clutch means for incrementally reverse rotating said conveyor roller to produce a retraction in a portion of said web, including a fluid pressure operated actuator and means for transferring rectilinear motion in said actuator to rotational movement in said conveyor roller;

(c) clamping means for immobilizing said leading portion of said web while said one portion is being retracted in order to effect a severance along a line of weakness defined by said web.

11. The apparatus of claim 10 wherein said drive mechanism comprises first and second drive chains, said first chain connecting said drive source to said clutch means and said second chain connecting an output of said clutch means with said conveyor roller such that actuation of said clutch interconnects said first and second drive chains.

12. The apparatus of claim 11 wherein said second drive chain is operatively connected to a reciprocal shuttle such that upon actuation of said actuator said shuttle is displaced and produces incremental translation in said second drive chain to produce reverse rotation in said conveyor roller.

13. In a packaging machine:

(a) structure establishing a path of travel for a web of interconnected bag-like containers;

(b) means for advancing said web along said path to successively position each of said containers at a loading station;

(c) means for expanding a container positioned at said loading station;

(d) product guide means movable into operative engagement with said expand container for guiding a product into said container;

(e) gripper means operative to immobilize said container at said loading station to inhibit relative movement between said container and said product guide means;

(f) container separating means for severing said container from said web, comprising means for reversing movement in said web while said container is immobilized, said separating means operative to retract the web to cause separation along a line of weakness connecting said containers to the web.

14. The packaging machine of claim 13 wherein said producing guide means comprises a funnel having a pair of pivotally mounted horns which together define a funnel-shaped structure when pivoted to a loading position.

15. The apparatus of claim 13 wherein:

(a) said means for advancing the web comprises:

(i) a pinch roller assembly defined by a conveyor roller and an associated feed roller biased into contact with said conveyor roller such that said rollers drivingly enage a web portion positioned between said rollers;

(ii) a roller drive mechanism that includes a drive source and a clutch for selectively coupling said drive source with said conveyor roller to drive said web portion in an advancing direction;

(b) said means for reversing movement in said web includes:

(i) a fluid pressure operated actuator; and, (ii) means for converting rectilinear motion in said actuator to rotational movement in said conveyor roller.

16. A packaging machine comprising:

(a) structure establishing a path of travel for a web of interconnected bag-like containers;

(b) means for advancing said web along said path to successively position each of said containers at a loading station;

(c) means for expanding a container positioned at said loading station;

(d) product guide means movable into operative engagement with said expanded container for guiding a product into said container;

(e) container immobilizing means operative to immobilize a container at said loading station to inhibit relative movemnt between said container and said product guide means;

(f) said web advancing means including web separating means for severing a container at said loading station from the remainder of said web, said separating means comprising reversing means that includes means for incrementally reverse rotating a conveyor drive roller to produce a retraction in a portion of said web, said reversing means including a fluid pressure operated actuator and means for transferring rectilinear motion in said actuator to rotational movement in said conveyor roller such that said container at said loading station is separated from said web along a line of weakness.

17. The apparatus of claim 16 wherein said container immobilizing means comprises a gripper mechanism which cooperates with said product guide means and [ooerates] *operates* to clamp said container at said loading station between a gripper surface and a clamping surface on said product guide means.

18. In a packaging machine:

(a) structure establishing a path of travel for a web of interconnected bag-like containers;

(b) means for advancing said web along said path to successively position each of said containers at a loading station;

(c) means for expanding a container positioned at said loading station;

(d) product guide means movable into operative engagement with said expanded container for guiding a product into said container;

(e) gripper means operative to immobilize said container at said loading station to inhibit relative movement between said container and said product guide means;

(f) container [separating] *separating* means comprising means for reversing movement in a web portion while said container is held by said immobilizing means, said separating means operative to retract said web portion to cause separation along a line of weakness connecting said container at said [lodding] *loading* station to said web;

(g) a feed hopper including a closure gate for holding product to be packaged until a container has been positioned and opened at said loading station.

19. A method of packaging comprising the steps of:

(a) providing a web of packaging material defining a plurality of containers, each container joined to a contiguous container by a line of weakness;

(b) advancing one of said containers to a loading station;

(c) expanding said container to an open position;

(d) positioning a product guide means in operative engagement with said container, said guide means operative to guide product into an opening defined by said container;

(e) immobilizing said container with respect to said product guide means;

(f) retracting a web portion a predetermined distance while said container remains immobilized with respect to said product guide means in order to cause separation of said web from said container along a line of weakness connecting said container to said web;

(g) releasing said container after it has been loaded in order to allow said loaded container to be discharged from said loading station.

20. The method of claim 19 further comprising the step of accumulating product to be packaged in an accumulating means until a container has been positioned and opened at said loading station.

21. The method of claim 19 further comprising the steps of:

(a) providing a pair of pivotally movable funnel members at said loading station to act as said product guide means;

(b) rotating said funnel members into an opening of said expanded container prior to loading product into said container.

*22. In a packaging machine:*

*(a) structure establishing a path of travel for a web of interconnected bag-like containers;*

*(b) means for advancing said web along said path to successively position each of said containers at a loading station;*

*(c) means for expanding a container positioned at said loading station;*

*(d) product guide means cooperable with said expanded container and operative to guide a product into said container;*

*(e) gripper means operative to restrict movement in said container; and,*

*(f) container separating means for severing said container from said web, comprising means for reversing movement in said web while said container is held by said gripper means said separating means operative to retract the web to cause separation along a line of weakness connecting said container to the web.*

*23. The packaging machine of claim 22 wherein said product guide means is movable into operative engagement with said expanded container and comprises a funnel having a pair of pivotally mounted horns which together define a funnel-shaped structure when pivoted to a loading position.*

*24. A method of packaging comprising the steps of:*

*(a) providing a web of packaging material defining a plurality of containers, each container joined to a contiguous container by a line of weakness;*

*(b) advancing one of said containers to a loading station;*

*(c) expanding said container to an open position;*

*(d) loading product into said container via an opening defined by said container;*

*(e) immobilizing said container;*

*(f) retracting a web portion a predetermined distance while said container remains immobilized in order to cause separation of said web from said container along a line of weakness connecting said container to said web; and,*

*(g) releasing said container after it has been loaded in order to allow said loaded container to be discharged from said loading station.*

*25. The method of claim 24 further comprising the step of directing product into said opening using a product*

*guide means disposed in operative engagement with said container.*

*26. In a packaging machine:*

*(a) structure establishing a path of travel for a web of interconnected bag-like containers;*

*(b) means for advancing said web along said path to successively position each of said containers at a loading station;*

*(c) means for expanding a container positioned at said loading station;*

*(d) container gripping means operative to hold said container at said loading station to inhibit relative reverse movement in said container; and,*

*(e) container separating means comprising means for reversing movement in a web portion while said container is held by said gripping means, said separating means operative to retract said web portion to cause separation along a line of weakness connecting said container at said loading station to said web.*

*27. The apparatus of claim 26 further comprising:*

*(a) product guide means operatively engageable with said expanded container for guiding product into said container; and,*

*(b) a feed hopper including a closure gate for holding product to be packaged until a container has been positioned and opened at said loading station.*

*28. The apparatus of claim 27 wherein said product guide means comprises a funnel positionable in an opening defined by said container.*

*29. The apparatus of claim 28 wherein said container immobilizing means comprises grippers for clamping a wall portion of said container against said funnel.*

*30. A method of packaging comprising the steps of:*

*(a) providing a web of packaging material defining a plurality of containers, each container joined to a contiguous container by a line of weakness;*

*(b) advancing one of said containers to a loading station;*

*(c) expanding said container to an open position;*

*(d) loading said open container;*

*(e) gripping said container using a clamping means;*

*(f) retracting said web a predetermined distance while said loaded container is held by said clamping means to cause separation of said web from said container along the line of weakness connecting said container to said web; and,*

*(g) releasing said clamping means to allow said loaded container to be discharged from said loading station.*

*31. The method of claim 30 wherein said clamping means clamps a wall portion of said container to a product guide means.*

*32. The method of claim 30 further comprising the steps of:*

*(a) providing a product guide means operatively engageable with said container; and,*

*(b) engaging said container with said product guide means prior to loading said container.*

*33. The method of claim 32 wherein said engagement between said container and said product guide means is provided by said clamping means.*

* * * * *